US010013269B2

(12) United States Patent
Moeller et al.

(10) Patent No.: US 10,013,269 B2
(45) Date of Patent: Jul. 3, 2018

(54) COMPONENT FRAMEWORK FOR DEPLOYING VIRTUAL MACHINES USING SERVICE PROVISIONING INFORMATION

(75) Inventors: Jan Moeller, Galten (DK); Steffen Grarup, Hoejbjerg (DK); Rene W. Schmidt, Risskov (DK)

(73) Assignee: VMware, Inc., Palo Alto, CA (US)

( * ) Notice: Subject to any disclaimer, the term of this patent is extended or adjusted under 35 U.S.C. 154(b) by 375 days.

(21) Appl. No.: 13/402,555

(22) Filed: Feb. 22, 2012

(65) Prior Publication Data

US 2013/0219388 A1 Aug. 22, 2013

(51) Int. Cl.
*G06F 9/44* (2018.01)
*G06F 9/455* (2018.01)
*G06F 8/60* (2018.01)
*G06F 9/50* (2006.01)

(52) U.S. Cl.
CPC ............ *G06F 9/45558* (2013.01); *G06F 8/60* (2013.01); *G06F 9/455* (2013.01); *G06F 9/5005* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 6,581,088 B1* | 6/2003 | Jacobs | ................... | G06F 9/548 709/203 |
| 7,127,526 B1* | 10/2006 | Duncan | ................... | G06F 15/16 709/249 |
| 8,032,942 B2* | 10/2011 | Smith | ................... | G06F 21/57 713/187 |
| 8,286,174 B1* | 10/2012 | Schmidt | ................ | G06F 9/5077 709/226 |
| 8,910,278 B2* | 12/2014 | Davne | ................ | H04L 63/0272 705/2 |
| 8,972,980 B2* | 3/2015 | Banga | ................... | G06F 9/5027 709/222 |
| 9,134,988 B2* | 9/2015 | Cavazza | ................... | G06F 8/63 |
| 9,317,453 B2* | 4/2016 | Armstrong | .......... | G06F 9/45558 |
| 2005/0094579 A1* | 5/2005 | Acharya | ............. | H04L 12/1813 370/260 |
| 2009/0172662 A1* | 7/2009 | Liu | ..................... | G06F 9/44505 718/1 |

(Continued)

OTHER PUBLICATIONS

OVF Tool Guide, VMware, Apr. 15, 2009.*

(Continued)

*Primary Examiner* — Abu Zar Ghaffari
(74) *Attorney, Agent, or Firm* — Patterson + Sheridan, LLP

(57) ABSTRACT

Virtual machines may be configured in a complex computing environment having dependencies among themselves and on the virtualization platform they operate on. The present disclosure formalizes these dependencies by defining a component framework that enables a deployer to know about the dependencies at deployment time and allow the platform to ensure that all required dependencies are satisfied at runtime. Disclosed is a set of Open Virtualization Format (OVF) sections that allow an OVF package to express dependencies to services using OVF meta-data. At deployment time, those OVF sections allow the platform to recognize and honor those dependencies, and at runtime provide the virtual machines with appropriate configuration meta-data.

18 Claims, 9 Drawing Sheets

(56) References Cited

U.S. PATENT DOCUMENTS

| | | | |
|---|---|---|---|
| 2009/0210869 A1* | 8/2009 | Gebhart | G06F 8/60 717/174 |
| 2009/0282404 A1* | 11/2009 | Khandekar et al. | 718/1 |
| 2010/0107163 A1* | 4/2010 | Lee | G06F 9/45533 718/1 |
| 2010/0192207 A1* | 7/2010 | Raleigh | G06Q 10/06375 726/6 |
| 2010/0223367 A1* | 9/2010 | DeHaan | G06F 8/61 709/222 |
| 2010/0291910 A1* | 11/2010 | Sanding | H04W 8/183 455/418 |
| 2011/0093849 A1* | 4/2011 | Chawla et al. | 718/1 |
| 2011/0107330 A1* | 5/2011 | Freundlich et al. | 718/1 |
| 2011/0202640 A1* | 8/2011 | Pillutla | 709/221 |
| 2011/0296411 A1* | 12/2011 | Tang | G06F 9/45545 718/1 |
| 2012/0117565 A1* | 5/2012 | Staelin | G06F 9/5072 718/1 |
| 2012/0174095 A1* | 7/2012 | Natchadalingam | G06F 8/65 718/1 |
| 2012/0246639 A1* | 9/2012 | Kashyap | G06F 9/45558 718/1 |
| 2013/0031546 A1* | 1/2013 | Agarwal | G06F 9/5072 718/1 |
| 2013/0060945 A1* | 3/2013 | Allam | G06F 9/5072 709/226 |
| 2013/0185715 A1* | 7/2013 | Dunning et al. | 718/1 |

OTHER PUBLICATIONS

"Open Virtualization Format Specification," Document No. DSP0243, Version 1.1.0, published by Distributed Management Task Force, Inc.—Jan. 1, 2010.

"Open Virtualization Format White Paper," Document No. DSP2107, Version 1.0.0, published by Distributed Management Task Force, Inc.—Feb. 6, 2009.

* cited by examiner

```
<Envelope xmlns:ovf="http://schemas.dmtf.org/ovf/envelope/1">
...
<VirtualSystem ovf:id="Web Server">
...
<vmw:vServiceDependencySection xmlns:ovf="http://schemas.dmtf.org/ovf/envelope/1"
                                xmlns:vmw="http://www.vmware.com/schema/ovf"
                                ovf:required="true"
                                vmw:id="odbc_dependency" >
    <ovf:Info>This specifies an ODBC vService dependency</ovf:Info>
    <vmw:Type>com.vmware.vservice.odbc</vmw:Type>
    <vmw:Name>ODBC Connection</vmw:Name>
    <vmw:Description>
        This VM requires access to the ODBC vService.
        This allows the VM to use ODBC for persisting data.
    </vmw:Description>
    <vmw:Configuration>
    </vmw:Configuration>
</vmw:vServiceDependencySection>
...
</VirtualSystem>
<Envelope>
```

Fig. 7

```
<Envelope xmlns:ovf="http://schemas.dmtf.org/ovf/envelope/1">
...
<VirtualSystem ovf:id="DB Server">
...
<vmw:vServiceProviderSection xmlns:ovf="http://schemas.dmtf.org/ovf/envelope/1"
        xmlns:vmw="http://www.vmware.com/schema/ovf"
        ovf:required="true"
        vmw:id="odbc_provider" >
    <ovf:Info>This specifies a provider of the ODBC vService</ovf:Info>
    <vmw:Type>com.vmware.vservice.odbc</vmw:Type>
    <vmw:Name>ODBC vService</vmw:Name>
    <vmw:Description>
        This VM is a provider of the ODBC vService.
    </vmw:Description>
</vmw:vServiceProviderSection>
...
</VirtualSystem>
<Envelope>
```

Fig. 8

```
<ve:vServiceEnvironmentSection xmlns:ve="http://www.vmware.com/schema/ovfenv"
    xmlns:evs="http://www.vmware.com/schema/vservice/ODBC"
    ve:bound="true"
    ve:id="odbc_dependency"
    ve:type="com.vmware.vservice.odbc">
  <evs:GuestApi>
    <evs:URL>https://10.20.63.39/odbc</evs:URL>
    <evs:Token>1efc34a14232f81a245b9e8172f7a383fdeab312</evs:Token>
    <evs:X509Thumbprint>2b:04:e6:7d:8c:7b:73:70:d4:29:32:ed:96:11:2b:ae:b4:a0:28:78</evs:X509Thumbprint>
  </evs:GuestApi>
</ve:vServiceEnvironmentSection>
```

Fig. 9

COMPONENT FRAMEWORK FOR DEPLOYING VIRTUAL MACHINES USING SERVICE PROVISIONING INFORMATION

BACKGROUND

The present disclosure is related to virtual machines and in particular to provisioning services when virtual machines are deployed on a virtualization platform.

Computing environments comprising virtual machines (VMs) are becoming increasingly common. Typically, a virtualization platform provides a hardware infrastructure and a software infrastructure for deploying and administering large configurations of virtual machines. Techniques for describing virtual machines are known. An industry standard for configuring virtual machines is the Open Virtualization Format (OVF). The OVF specification, entitled "Open Virtualization Format Specification," Document Number DSP0234, Version 1.1.0 (Jan. 1, 2010), published by Distributed Management Task Force, Inc. (DMTF), describes the packaging and distribution of software to be run in virtual machines, and is incorporated herein by reference in its entirety for all purposes. The OVF format is described in a white paper entitled "Open Virtualization Format White Paper," Document Number DSP2107, Version 1.0.0 (Feb. 6, 2009), published by DMTF, and is incorporated herein by reference in its entirety for all purposes.

Virtual machines may form a complex computing environment and have dependencies among themselves and on the platform they operate on. The OVF specification provides a mechanism for specifying some of those dependencies, including the virtual hardware (e.g., CPU, controllers, Ethernet devices, and so on) and virtual disks that constitute a virtual machine.

The OVF specification defines a virtual appliance as a collection of one or more virtual machines that provide a service. For example, the VMware vSphere® 4.0 software operates a virtualization platform that can manage virtual appliances, referred to as a "vApp" in the VMware vSphere® software environment. For instance, a customer relationship management (CRM) solution may be provided as a vApp that contains a database server VM, an application server VM, and a web server VM, packaged into an OVF package. A vApp, therefore, can express some level of dependency between virtual machines by grouping related virtual machines together and defining startup order semantics.

The computing environment of an enterprise typically involves a large collection of interoperating computing systems. Virtualization provides a platform to facilitate the management of multiple computing systems in the form of virtual machines. The OVF specification and the idea of virtual appliances provide a starting point for managing dependencies among the many virtual machines that may comprise an enterprise computing environment. However, as the size of the computing environment grows, so does the number of dependencies. The ability to formally express platform dependencies with OVF is limited, and so handling large dependencies in a complex computing environment becomes increasingly inefficient. vApps, for example, allow a developer to express that the virtual machines of a multi-tiered solution depend on each other at an abstract level, but a vApp does not allow the developer to express how the virtual machines depend on each other or how they depend on the virtualization platform.

SUMMARY

In some embodiments, a method in a virtualization platform for deploying one or more virtual machines includes receiving configuration information which specifies a configuration of one or more virtual machines and defining one or more virtual machines. For a first virtual machine, a service to be consumed by the virtual machine is identified. A service provider which can provide the service is identified. The virtualization platform may then generate runtime information relating to provisioning of the service to the first virtual machine during runtime. The runtime information may be provided by the service provider.

In embodiments, the service to be consumed by the virtual machine may be obtained from the configuration information. The configuration information may further include information indicating whether or not the service is required by the virtual machine. In a particular embodiment, the configuration information is an OVF package that conforms to the Open Virtualization Format Specification.

In embodiments, where more than one service provider is identified, a user may select one of the service providers.

The service providers may be accessed on the virtualization platform, or may be accessed over a communication network. In some embodiments, the service provider may be a virtual machine running on the virtualization platform.

The following detailed description and accompanying drawings provide a more detailed understanding of the nature and advantages of the present disclosure.

BRIEF DESCRIPTION OF THE DRAWINGS

FIGS. 7-9 are illustrative examples of extensions of an OVF package.

DETAILED DESCRIPTION

In the following description, for purposes of explanation, numerous examples and specific details are set forth in order to provide a thorough understanding of embodiments of the present disclosure. Particular embodiments as defined by the claims may include some or all of the features in these examples alone or in combination with other features described below, and may further include modifications and equivalents of the features and concepts described herein.

In accordance with principles set forth in the present disclosure, specific dependencies among virtual machines may be formalized in a way that an administrator deploying the virtual machines on a virtualization platform can review those dependencies at deployment time and the virtualization platform can assess whether all the required dependencies are satisfied at runtime. In particular embodiments, configuration information represented in a virtualization package format specifies a configuration of one or more virtual machines. A particular example of a virtualization package format is the OVF package format in accordance with the OVF specification. The configuration information may contain sections that allow the expression of dependencies of virtual machines to services. In embodiments, a virtualization platform deploying a virtualization package may recognize and honor those service dependencies at deployment time, and may provide virtual machines with appropriate configuration meta-data to provide those services at runtime.

Figure 1:
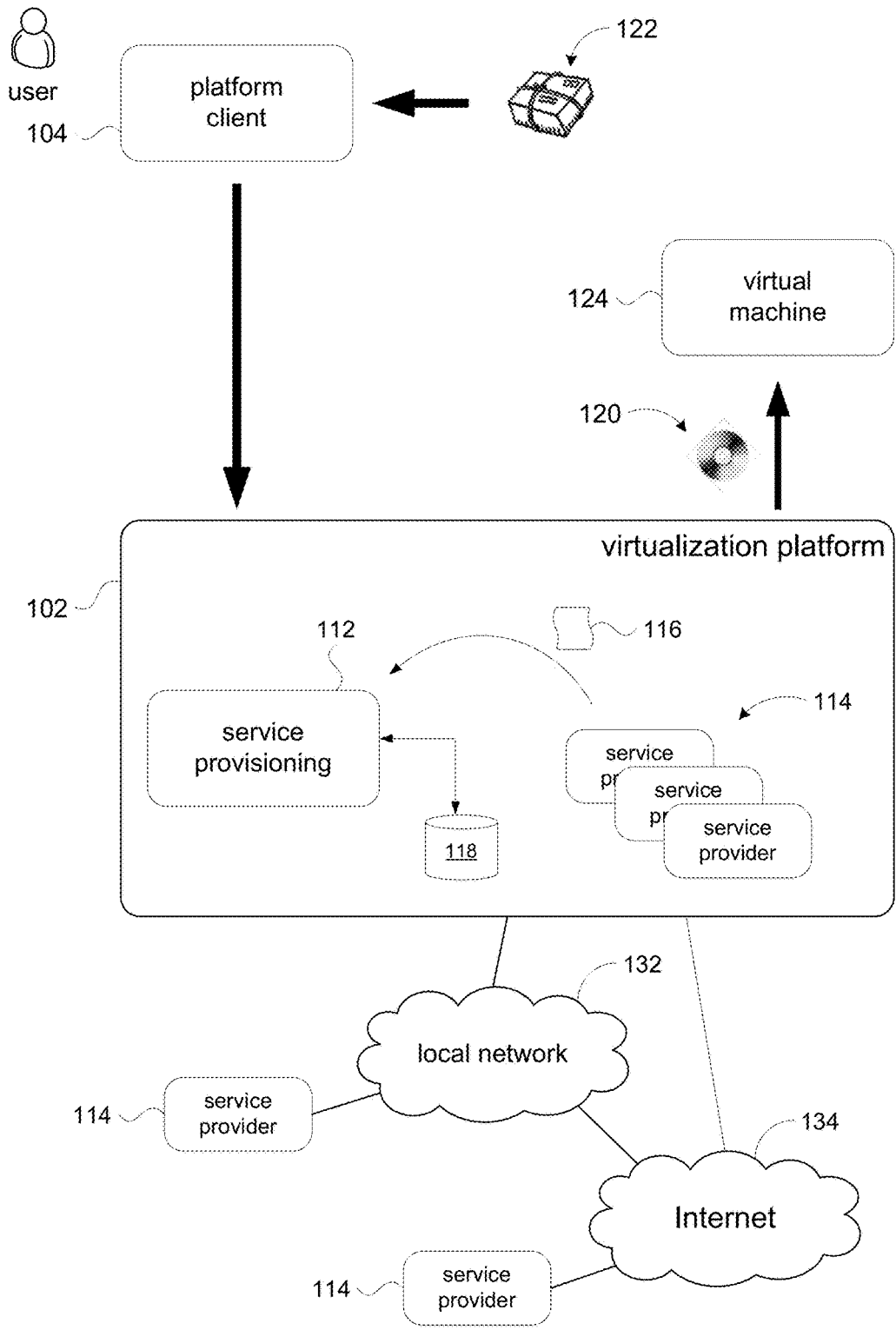
FIG. 1 shows a virtualization platform in accordance with principles set forth in the present disclosure.

Referring to FIG. 1, in embodiments, a virtualization platform 102 may deploy one or more virtual machines 124 in accordance with certain configuration information 122. The configuration information 122 may be provided via a platform client 104. For example, a user (e.g., system administrator) using the platform client 104 may specify the configuration information 122 and cause the configuration information to be downloaded to the virtualization platform 102.

The configuration information 122 includes information about each virtual machine to be deployed, and may include information that identifies one or more services to be used (consumed) by a virtual machine. The term "service" as used in the present disclosure may refer to functionality that is consumed at the machine level. For example, VMware® High Availability is a machine-level service that ensures the virtual machine is always available. A service may be functionality that is consumed by one or more applications executing on the virtual machine (an application-level service). For example, a CRM application running on a virtual machine may need a service that provides access to a database. Reference to "services" will be understood to include machine-level services as well as application-level services.

The virtualization platform 102 includes a service provisioning component 112 that "binds" one or more service providers 114 to a virtual machine 124. In embodiments, the service binding between a service provider 114 and a service consumer (e.g., virtual machine 124) may be set forth in the configuration information 122. In accordance with principles of the present disclosure, the binding process includes generating service provisioning information 116 that may be provided to the virtual machine 124 along with some runtime information 120 when the virtual machine is powered on. The service provisioning information 116 allows the service consumer to access the service provider 114. Service providers 114 may be installed in the virtualization platform 102. For example, the virtualization platform 102 may have services built into the hardware or software infrastructure of the virtualization platform. Services may be provided by virtual machines deployed on the virtualization platform 102. Service providers 114 may be accessible over a communication network such as a local network 132 (e.g., local area network, LAN, or wide area network, WAN) the Internet 134, and so on. A database 118 of known service providers may be provided.

Figure 2:
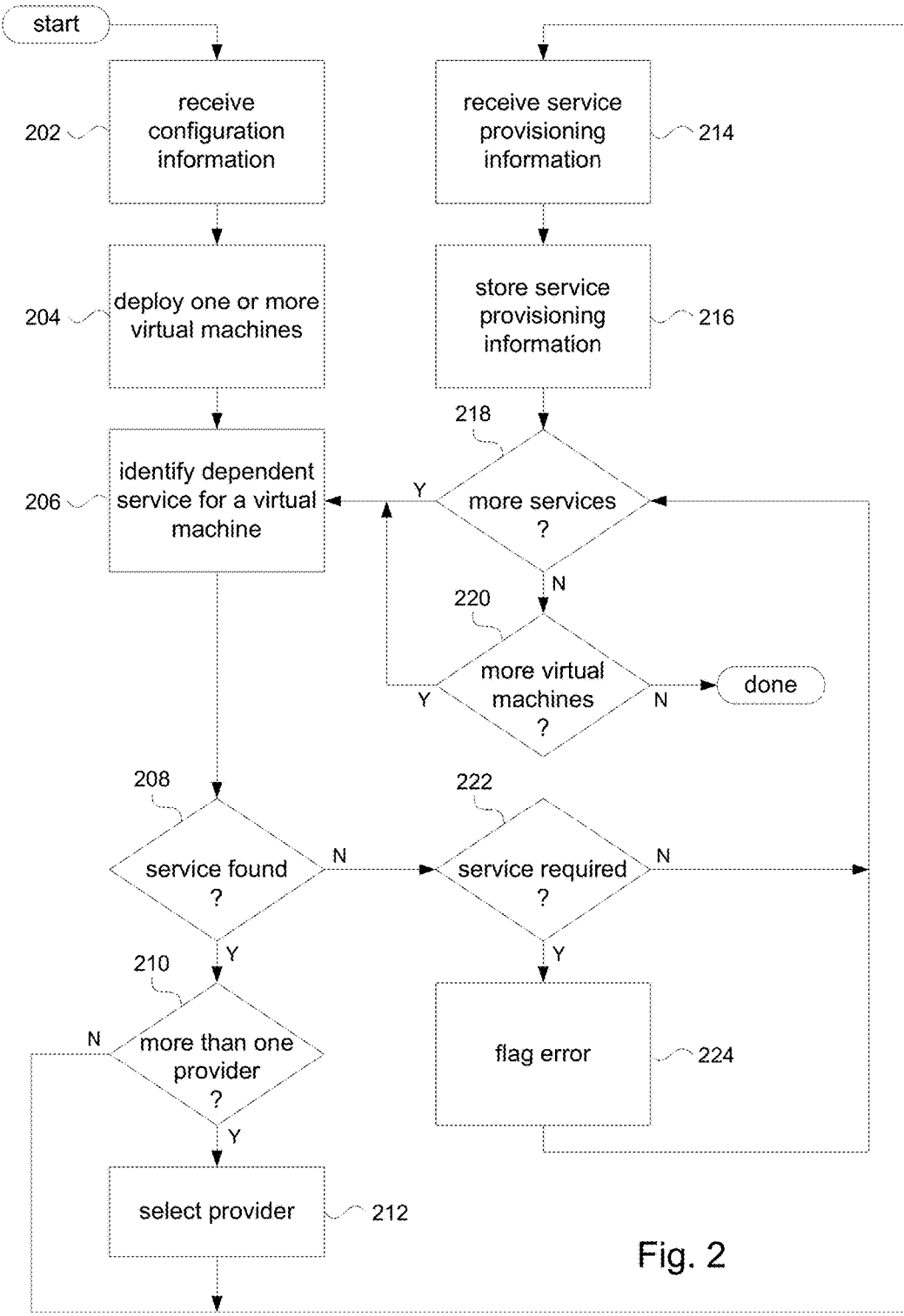
FIG. 2 shows a workflow for deploying virtual machines in accordance with the present disclosure.

FIG. 2 represents a workflow, in accordance with some embodiments, for deploying virtual machines on the virtualization platform 102. Referring to FIGS. 1 and 2, in a step 202 the virtualization platform 102 may read in the configuration information 122 as a file that specifies a configuration of one or more virtual machines 124. For example, a user (e.g., a system administrator) using the platform client 104 may access the configuration information 122 and download it into the virtualization platform 102. The configuration information 122 may be stored in a local data store (not shown) that is managed by the virtualization platform 102. The configuration information 122 may be accessed from a remote data store over a communication network (e.g., 132, 134), and so on. In an embodiment, the configuration information 122 may be contained in an OVF package specified in accordance with the OVF specification and extended in accordance with the present disclosure. Details of such extensions will be discussed below.

In a step 204, the virtualization platform 102 may deploy the one or more virtual machines specified in the configuration information 122. In a step 206, service dependency in a virtual machine may be determined by the service provisioning component 112 of the virtualization platform 102. In some embodiments, service dependency may be specified in the configuration information 122. If a virtual machine depends on a service ("dependent service"), then the service provisioning component 112 determines (step 208) whether the dependent service is available on the virtualization platform 102. For example, services may be built into the virtualization platform 102 itself. Service providers may be software/hardware components that have been installed on the virtualization platform 102. Service providers may be external entities, such as web services provided over a communication network 132 or 134, that have been registered or otherwise made known to the service provisioning component 112, and so on. In embodiments, the service provisioning component 112 may access the provider database 118 to find a service provider that matches the dependent service. The "YES" branch of the step 208 proceeds to a "binding" process, where a service provider is assigned or otherwise associated with the virtual machine that depends on the dependent service. The "NO" branch of step 208 is discussed below.

In a step 210, if only one service provider 114 is found that can provide the dependent service, then the binding process continues at a step 214. If there are multiple matching candidate service providers, then in a step 212, a service provider 114 is selected from among the candidates. In some embodiments, a user, for example at the platform client 104, may be prompted to select a service provider 114. In some embodiments, the service provisioning component 112 may present some usage information or other statistics about each candidate service provider to inform the selection process. In some embodiments, the user may elect to operate in an automated fashion where the service provisioning component 112 uses some predetermined algorithm to select a service provider. This automated mode of operation may be useful for performing an initial deployment of virtual machines on the virtualization platform 102 during an installation of a computing environment, for example. The user may then re-assign service providers subsequent to the initial deployment. When a service provider has been selected, processing proceeds to step 214 to continue with the binding process.

In step 214, the service provisioning component 112 obtains service provisioning information 116 from the selected service provider. The service provisioning information 116 is used by the virtual machine to access the selected service provider after the virtual machine has been booted up. For example, the service provisioning information 116 may include login information (e.g., login name, password) and other such information that may be needed in order for communication to happen between the virtual machine and the selected service provider. In embodiments, this step may involve providing information to inform the selected service provider as any specific service requirements of the virtual machine in order to generate suitable service provisioning information 116. Such information may be set forth in the configuration information 122 which specifies the virtual machine.

In an embodiment, each service provider listed in the provider database 118 may include corresponding service provisioning information 116. In other embodiments, the service provisioning information 116 may be obtained on-the-fly. For example, a communication protocol may be defined between the service provisioning component 112 and service providers, allowing the service provisioning component to obtain the service provisioning information 116 from the service provider. This approach is suitable when the service provisioning information 116 is not static but rather is dynamic. For example, in the case of login information, it may be preferable that logins and passwords be unique to each virtual machine.

In a step 216, the service provisioning information 116 obtained in step 214 may be stored in a data store (not shown) that is accessible by the virtualization platform 102. In a step 218, if the virtual machine is dependent on another service, then the foregoing process is repeated with step 206. In embodiments, for example, the configuration information 122 may be consulted to determine if there is another service that the virtual machine is dependent upon. Otherwise, processing proceeds to a step 220 to determine if another virtual machine is specified in the configuration information 122 that is dependent on one or more services. If there is another virtual machine, then the foregoing process is repeated with step 206; otherwise the deployment of virtual machines may be deemed completed.

Returning to decision step 208, if a dependent service is not found ("NO" branch of step 208), then in a step 222 a determination is made whether that dependent service is required by the virtual machine or not. A "required service" may be a service that the virtual machine (or the application) must have access to in order to function properly. Thus, if a service provider for a dependent service is not available (step 208, "N") and that dependent service is a required service (step 222, "Y"), then in a step 224 an error is flagged. For example, the platform client 104 may display an error message or otherwise notify the user (e.g., via email) with information to the effect that the virtualization platform 102 cannot provide a service that is required by a virtual machine. The error may be logged for later review, for remedial action, and so on. Processing may then proceed to step 218 to determine if the virtual machine is dependent on additional services. Returning to step 222, if the unavailable dependent service is not required, then processing may simply proceed to step 218 to determine if the virtual machine is dependent on additional services. In some embodiments, a warning message may nevertheless be presented at the platform client 104 or otherwise made known to the user such as by email, in an error log, and so on to inform the user of the unavailable dependent service.

Figure 3:
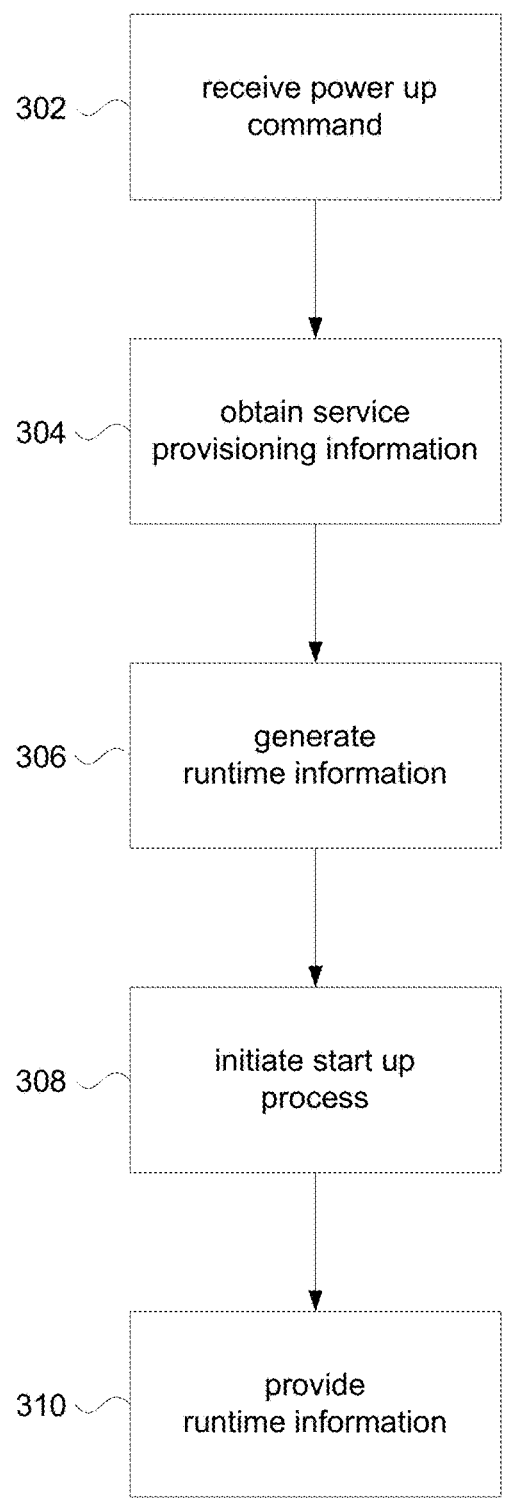
FIG. 3 shows a workflow for starting up virtual machines in accordance with the present disclosure.

Referring to FIGS. 1 and 3, a workflow for starting up (booting, power on, etc.) virtual machines on the virtualization platform 102 in accordance with the present disclosure will now be described. In a step 302, the start up process may be initiated by receiving a power up command for the virtual machine. For example, a user at the platform client 104 may select one or more virtual machines that are deployed in the virtualization platform 102 and issue a command to start them up. An automated process may issue the start command (e.g., via a cron process), and so on.

In a step 304, if a virtual machine has associated service provisioning information 116, the virtualization platform 102 may access that information. In a step 306, the virtualization platform 102 generates runtime information 120 comprising information that is used to configure the virtual machine. For example, the runtime information 120 may include host names, IP addresses, and other OS-level configuration information. The runtime information 120 may include configuration information specific to applications that run on the virtual machine. In accordance with the present disclosure, service provisioning information 116 associated with the virtual machine may be incorporated with the runtime information 120.

In a step 308, the virtualization platform 102 may initiate the start up process for a virtual machine. In embodiments, this is equivalent to providing power to a physical machine. In both cases, the machine (physical or virtual) will perform a boot-up sequence. The runtime information 120 may be provided (in a step 310) to the virtual machine during the start up process. In an embodiment, for example, the runtime information 120 may be represented as a virtual CD-ROM and "inserted" into the virtual machine. When the virtual machine powered on, it will read the virtual CD-ROM as part of its boot-up sequence, thus reading in the runtime information 120. OS-level runtime information (including OS-level service provisioning information) may be used during or after the start up sequence to configure itself. Similarly, application-level runtime information (including application-level service provisioning information) may be used when the corresponding application(s) are started up by the virtual machine.

I. Component Framework

The discussion will now turn to a specific embodiment. In particular, the VMware vSphere® 5.0 virtualization platform, which is built around an extensible component framework that embodies the foregoing concepts and principles of the present disclosure, will be described merely as an illustrative example. The component framework facilitates describing dependencies between virtual machines, virtual appliances (referred to as vApps in the VMware vSphere® software environment), and the virtualization platform they operate on. The component framework enables the deployment of virtual machines between different virtualization platforms in a platform independent manner, allowing the user to express a dependency on a service without having to consider the implementation of the service. Thus, for example, a vApp can bind to the same service provided on the VMware vSphere® virtualization platform and on the VMware vCloud® application platform while allowing the underlying implementation to be different, thus achieving a high degree of platform interoperability.

In a specific embodiment, the foregoing concepts and principles are embodied in the following component framework elements which provide a formal definition for services provided and consumed by vApps, virtual machines, and the underlying virtualization platform: a vService, a vService Dependency, a vService Consumer, a vService Provider, and a vService Binding. A multi-tiered Web-solution executing on a vSphere® virtualization platform shown in FIG. 4 will provide illustrative examples the component framework elements.

Figure 4:
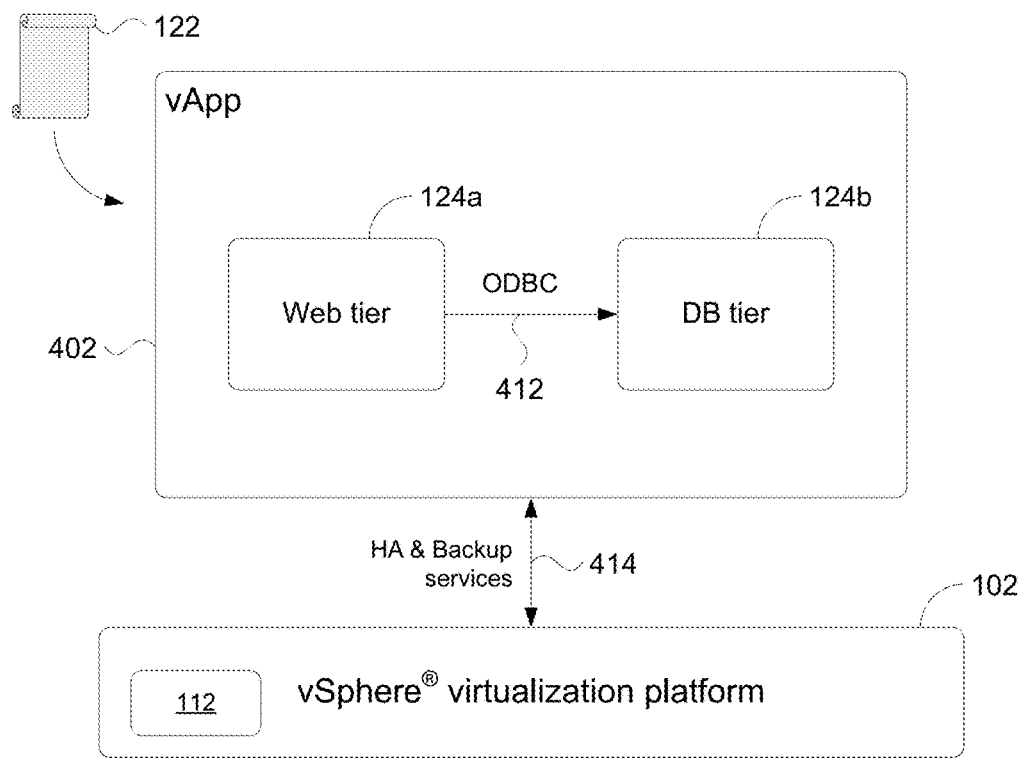
FIG. 4 illustrates an example of service dependencies.

The configuration information 122 depicted in FIG. 1 for configuring virtual machines is represented in FIG. 4 as an OVF package. The OVF package 122 defines a vApp 402 for the multi-tiered Web-solution. The vApp 402 contains two virtual machines: a Web tier 124a and a database (DB) tier 124b. The Web tier 404 depends on a database service that is provided by the DB tier 124b. The vApp 402, in turn, depends on a server failover service called VMware® High Availability (HA) service and a backup service, provided by the virtualization platform 102.

The service provisioning component 112, acting in accordance with the workflows shown in FIGS. 2 and 3, satisfies the database service required by the Web tier 124a by supplying service provisioning information 116 (e.g., ODBC communication parameters) received from the DB tier 124b to the Web tier, thus providing for an ODBC connection 412 between the Web tier 124a and the DB tier 124b during runtime. In addition, the services required by vApp 402 may be satisfied when the virtualization platform enforces HA rules 414 on the Web tier 124a and the DB tier 124b, and connects the Web tier and DB tier with appropriate backup services.

vService

The service that a vApp or virtual machine depends on is referred to in a particular embodiment as a "vService." Examples of services in FIG. 4 include the database service required by the Web tier 124a and the HA service and backup service required by the vApp 402. A vService is a specification of a service that vApps or virtual machines depend on. The vService does not manifest itself; for example, the vService is not set out in the OVF package 122. Rather, the vService may be viewed as a functional specification that a developer of the service and a consumer of the service may agree on to define the service and a mechanism (e.g., API) for providing the service. In embodiments, a vService may comprise three parts:

An XML schema defining a vService configuration section that vApps and virtual machines can use to express requirements to the vService provider in the OVF package, from which they are deployed.

An XML schema defining a vService environment section that is provided to the virtual machine at runtime as part of its OVF environment (discussed below).

A specification of a guest application programming interface (guest-API) implemented by the vService provider that the virtual machine can access at runtime. This specification is optional because the service may not require an API.

A vService has a "type" (e.g., an identifier) that uniquely identifies the vService specification. In accordance with the present disclosure, a user of a vService only needs to know this specification. They do not need to know how the interface is provided (i.e., implemented). In fact, multiple different implementations might exist.

vService Dependency

The dependency of a virtual machine on a particular service is referred to in a particular embodiment as a "vService dependency." A vService dependency allows a vApp or virtual machine to formally express that it requires a certain vService to be available on the target virtualization platform. For instance, in the multi-tiered Web-solution example of FIG. 4, the Web tier 124a has a vService dependency to the DB tier 124b. In the OVF package 122, a vService dependency is expressed as a vServiceDependency section in the entity that has the dependency (e.g., Web tier 124a). This section may contain a vServiceConfiguration element that contains vService specific configuration. This element conforms to the vService configuration XML schema defined by the vService.

A vService dependency does not simply express an abstract relationship between two entities. It has a type which identifies a specification that formally describes the vService provided, but not the implementation. This allows several vService providers to co-exist, each providing the same vService, and possible in very different ways. When deploying an OVF package that contains vService dependencies, these dependencies are resolved by binding them to matching vService providers.

vService Consumer

A virtual machine or vApp that depends on a service is referred to in a particular embodiment as a "vService consumer." A vService consumer is an entity that has one or more vService dependencies; e.g., the Web tier 124a is a vService consumer and likewise the vApp 402 is a vService consumer. While vService dependencies are typically defined on vApps and virtual machines, they may be defined on other network connected entities, such as physical hardware or Java processes. Although the present disclosure focuses on vService consumers that use OVF as their deployment vehicle, the principles disclosed herein may be applicable to entities that do not use OVF as their deployment vehicle.

vService Provider

When an entity provides a service that entity is referred to, in a particular embodiment, as a "vService provider." A vService provider is some entity that implements one or more vServices. This means that:

The vService provider consumes the vService configuration element of a vService dependency. The vService configuration element matches the XML schema defined in the vService specification. The vService consumer uses this element to express requirements to the vService provider.

The vService provider generates a vService environment section for the OVF environment of the vApp. This section matches the XML schema defined in the vService specification. The vService provider uses this section for configuring the vService consumer.

The vService provider implements an (optional) API that is provided to the vService consumer at runtime, if any. This API if present is part of the vService specification.

In embodiments, vService providers may be VirtualCenter (VC) extensions, vApps, virtual machines, or external entities such as services accessed over the Internet or other communication network. For example, referring to FIG. 4, the DB tier 124b is a vService provider that matches the vService dependency of the Web tier 124a, which itself is a vService consumer. The virtualization platform 102 in FIG. 4 is also another example of a vService provider.

vService Binding

The process of satisfying a dependency with a service is referred to in a particular embodiment as "vService binding." In embodiments, several providers may provide the same vService on a platform, vService binding may further involve specifying which dependency is bound to which provider. Binding dependencies to providers may be accomplished in one of two ways:

As part of the deployment process, where the deployer for each dependency chooses among matching providers.

After deployment, where an administrator chooses to bind an unbound dependency to a matching provider, or rebind a dependency to another matching provider.

vService dependencies may be required or optional. If a vService consumer has a dependency that is required it must be bound before it is powered on.

Figure 5:
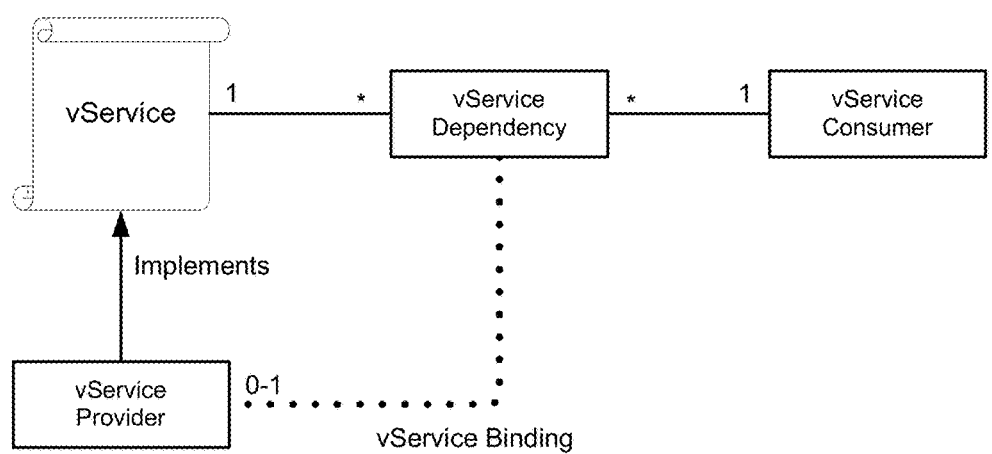
FIG. 5 depicts a relationship among component framework elements.

FIG. 5 depicts the relationships among the component framework elements. The vService specifies the functionality and the API for a service that may be consumed. The vService provider implements that service and provides the service via the virtualization platform 102 (FIG. 4). The vService consumer informs the virtualization platform 102 of its dependency on a service by way of incorporating dependency information in the OVF package 122. When the virtualization platform 102 deploys a vService consumer (e.g., vApp or virtual machine), the OVF package 122 informs the deployment process of the dependency and performs a vService binding.

II. Deployment, Binding, Runtime

Figure 6:
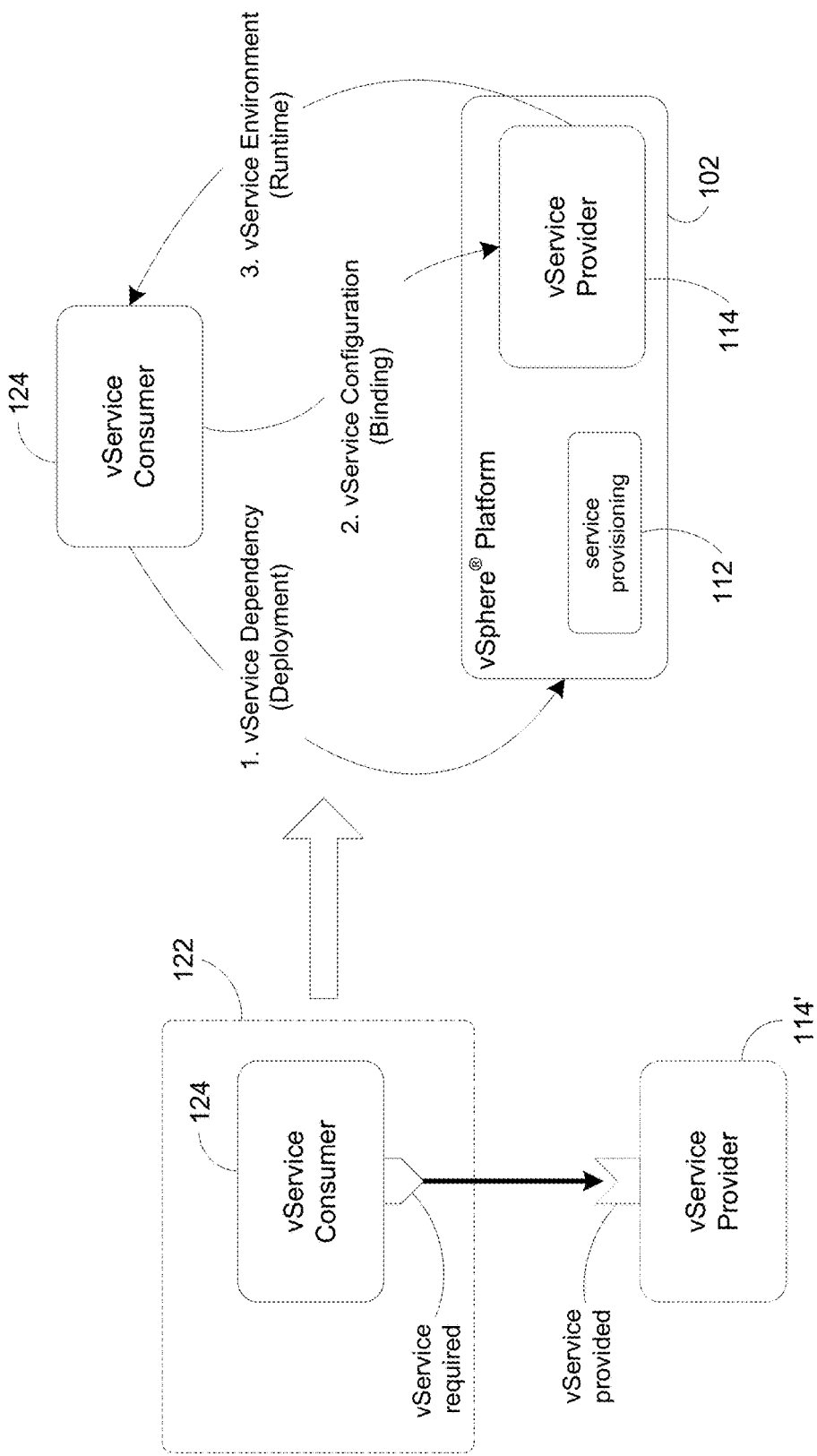
FIG. 6 depicts various phases in the workflow of FIG. 2.

FIG. 6 is a pictorial depiction of the workflow shown in FIG. 2 for a vApp or virtual machine, showing deployment, binding, and runtime phases of the workflows. The configuration information 122 (e.g., an OVF package) specifies a virtual machine 124 (e.g., vService consumer), including a vService required by the vService consumer. The figure shows that the required vService may be provided by some vService provider 114'.

The configuration information 122 is submitted for deployment of the specified virtual machine 124 on the virtualization platform 102. Operation 1 represents a deployment phase of the workflow shown in FIG. 2, for example, steps 204-212, where the vService dependency of the deployed virtual machine 124 is determined by the service provisioning component 112 of the virtualization platform 102; e.g., based on the vService dependency information in the configuration information 122. Operation 2 represents a binding phase of the workflow shown in FIG. 2, for example, step 214, where the vService provider 114 is informed of the virtual machine's service requirements by way of the vService configuration element in the vService-Dependency section of the configuration information 122. Operation 3 represents a runtime phase the workflow shown in FIG. 2, for example, steps 214-216, where the vService provider 114 configures the runtime environment of the virtual machine 124 by creating a vServiceEnvironment section in the OVF environment which is loaded into the virtual machine 124 at runtime.

It will be appreciated that the vService type, not the component framework, dictates the semantics of the vService configuration (step 2) or the vService environment (step 3). The component framework just provides a secure channel where it mediates the meta-data between the consumer and the provider. The vService type sets forth the specifics between the consumer and the provider, so that the vService consumer and the vService provider may communicate using any suitable implementation of guest-API.

III. OVF Integration

This section describes how vService dependencies, vService providers, and vService environments are expressed as OVF sections in an OVF package, and how they affect the virtualization platform (e.g. 102, FIG. 1). FIG. 7, for example, shows the relevant parts of an OVF package that describe the ODBC vService dependency for the Web-solution example of FIG. 4. The vServiceDependencySection section describes that the Web tier 124a depends on the ODBC vService identified by the vService Type "com.vmware.vservice.odbc". The Name and Description elements provide human-readable and localizable information about the dependency. The Configuration element contains additional requirements to the ODBC vService provider. For example, this would allow the Web tier 124a to specify a minimum database size, minimum number of transactions per second or something similar. The XML schema for the vServiceConfiguration element is part of the vService specification. A vService dependency may be required or optional, which is expressed with the ovf:required attribute. In our example, we have ovf:required="true", which means that the vApp can be deployed but not powered on unless it is bound to an ODBC vService provider. If ovf:required="false" the dependency expresses that the vApp can run without being bound to provider.

FIG. 8 shows the relevant parts of an OVF package that describe the ODBC vService provider for the Web-solution example of FIG. 4. The vServiceProviderSection section declares that this vApp provides the ODBC vService identified by the vService Type "com.vmware.vservice.odbc", and that the vApp needs access to the vService Provider API exposed by the platform. Credentials and connection parameters for the vService Provider API are supplied to the vApp in its OVF environment. This allows the provider and platform to establish a secure communication channel. The platform uses this channel to tell the provider when vService dependencies are bound or unbound.

When deploying the above OVF package on the VMware vSphere® virtualization platform, the user is notified that the vApp he is deploying is in fact a vService provider which implements the ODBC vService. Once the vService provider is deployed and powered on, vSphere is extended to provide the ODBC vService. This means that an administrator can bind vService consumers that depend on this vService to the vService provider and run on the vSphere® virtualization platform.

IV. OVF Environment

Once a dependency is bound to a provider, the provider generates a corresponding vService environment. The vService environment represents an example of the service provisioning information 116 discussed above in step 214 of FIG. 2. For the ODBC vService example in FIG. 3, the vService environment contains connection parameters and credentials for the guest-API. FIG. 9 shows an example of the vService environment. Once the virtual machine is powered on, the vService environment for each of its bound dependencies are supplied to the virtual machine in its OVF environment. The OVF environment represents an example of the runtime information 120 discussed above in FIG. 4. The OVF environment may be made available to the guest (e.g., software such as the OS and applications executing on the virtual machine) on an ISO image (e.g., a CD-ROM image), or using VMware® Tools. The guest reads the OVF environment and configures its dependencies based on that. vService environments can be used for establishing secure guest-API connections, and more generally can be used for configuring anything that may need to be configured.

Figure 10:
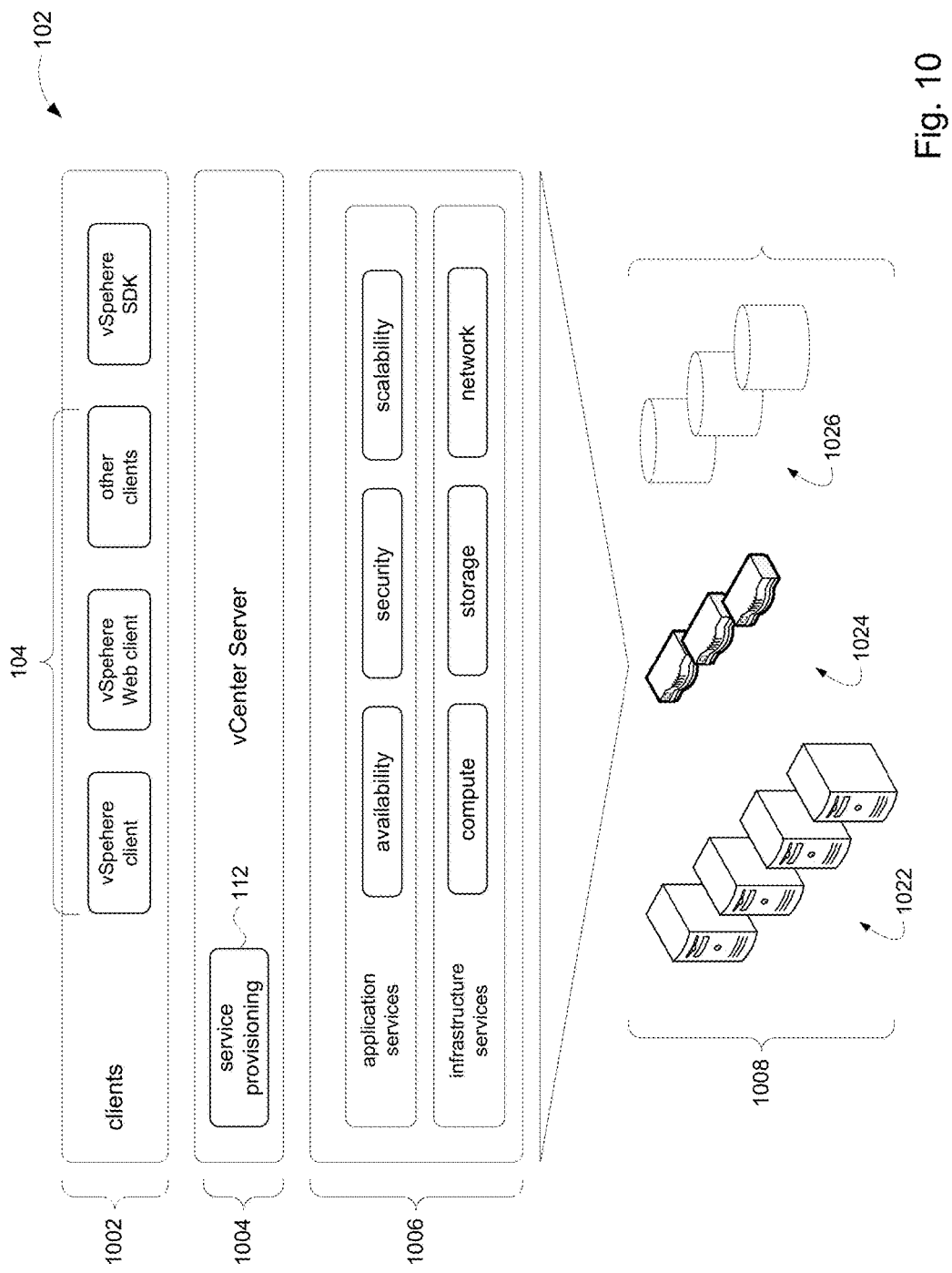
FIG. 10 is an illustrative example of a specific embodiment of the present disclosure.

Referring to FIG. 10, the VMware vSphere® virtualization platform 102 includes a hardware infrastructure 1008 comprising a collection of CPUs 1022, network devices 1024, storage 1026, and the like. A software infrastructure comprises a virtualization layer 1006, a management layer 1004, and an interface layer 1002.

The virtualization layer 1006 includes infrastructure services and application services. Infrastructure services such as compute, storage, and network services operate to abstract, aggregate, and allocate hardware or infrastructure resources. Infrastructure services include the following types:

Compute services include the VMware capabilities that abstract away from underlying disparate server resources. Compute services aggregate these resources across many discrete servers and assign them to applications.

Storage services include the set of technologies that enable the most efficient use and management of storage in virtual environments.

Network services include the set of technologies that simplify and enhance networking in virtual environments.

Application services are services that ensure availability, security, and scalability for applications. Examples include VMware vSphere® High Availability and Fault Tolerance.

The management layer 1004, called vCenter Server, is the central point for configuring, provisioning, and managing virtualized IT environments. The management layer 1004 includes the service provisioning component 112 of the present disclosure.

The interface layer 1002 provides users with access to the virtualization platform 102 through GUI clients 104 such as the vSphere Client or the vSphere Web Client. Additionally, users can access the platform through client machines that use command line interfaces and software developer kits (SDKs) to develop automated management tools.

One or more embodiments (e.g., service provisioning component 112) may be implemented as one or more computer programs or as one or more computer program modules embodied in one or more computer readable storage media (e.g., storage 1006). The term computer readable storage medium refers to any data storage device that can store data which can thereafter be input to a computer system—computer readable media may be based on any existing or subsequently developed technology for embodying computer programs in a manner that enables them to be read by a computer (e.g., CPUs 1022). Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a virtualization platform for configuring one or more virtual machines on the virtualization platform, the method comprising operating a computer processor of the virtualization platform to perform steps of:
   receiving configuration information which specifies a configuration of one or more virtual machines;
   deploying a first virtual machine on the virtualization platform based on the configuration information;
   identifying, by a service provisioning component in the virtualization platform, and external to the first virtual machine, from the configuration information, a software service including functionality to be consumed by application software installed on the first virtual machine prior to booting the first virtual machine;
   identifying, by the service provisioning component, a provider of the software service in a provider database, wherein the provider is remote from the first virtual machine;
   receiving, at the service provisioning component prior to booting the first virtual machine, service provisioning information from the provider of the software service, the service provisioning information including information for accessing the software service upon execution of the application software within the first virtual machine after booting the first virtual machine;
   providing the service provisioning information to the first virtual machine while booting the first virtual machine prior to execution of the application software;
   generating runtime information to configure the first virtual machine during boot, the runtime information including the service provisioning information;
   storing the runtime information in a data store accessible by first virtual machine during boot; and
   booting the first virtual machine.

2. The method of claim 1, wherein the configuration information further specifies service dependency information which specifies the software service to be consumed by the first virtual machine.

3. The method of claim 2, wherein the service dependency information indicates whether the software service to be consumed by the first virtual machine is required by the first virtual machine or is optional.

4. The method of claim 1, wherein the configuration information is an Open Virtualization Format (OVF) package in accordance with the Open Virtualization Format Specification.

5. The method of claim 4, wherein the OVF package comprises a service dependency section that identifies the software service to be consumed by the first virtual machine.

6. The method of claim 1, wherein the provider is identified from among a plurality of providers which can provide the software service.

7. The method of claim 6, further comprising receiving selection information from a user that identifies the provider from among the plurality of providers.

8. The method of claim 1, wherein the provider is a virtual machine running on the virtualization platform.

9. The method of claim 1, wherein the runtime information is generated using data stored in an Open Virtualization Format (OVF) environment document.

10. A system for providing a virtualization platform comprising:
a computer processor; and
a storage subsystem, the storage subsystem having stored thereon computer code comprising executable program code configured to cause the computer processor to:
receive configuration information which specifies a configuration of one or more virtual machines; and
deploy a first virtual machine on the virtualization platform based on the configuration information;
identify, by a service provisioning component in the virtualization platform, and external to the first virtual machine, from the configuration information, a software service including functionality to be consumed by application software installed on the first virtual machine prior to booting the first virtual machine;
identify, by the service provisioning component, a provider of the software service in a provider database and associating the provider with the first virtual machine, wherein the provider is remote from the first virtual machine;
receive, at the service provisioning component prior to booting the first virtual machine, service provisioning information from the provider of the software service, the service provisioning information including information for accessing the software service upon execution of the application software within the first virtual machine after booting the first virtual machine;
provide the service provisioning information to the first virtual machine while booting the first virtual machine prior to execution of the application software;
generate runtime information to configure the first virtual machine during boot, the runtime information including the service provisioning information;
store the runtime information in a data store accessible by first virtual machine during boot; and
boot the first virtual machine.

11. The system of claim 10, wherein the configuration information further specifies service dependency information which specifies the software service to be consumed by the first virtual machine.

12. The system of claim 10, wherein the configuration information is an Open Virtualization Format (OVF) package in accordance with the Open Virtualization Format Specification.

13. The system of claim 12, wherein the OVF package comprises a service dependency section that identifies the software service to be consumed by the first virtual machine.

14. The system of claim 10, wherein the executable program code is further configured to cause the computer processor to receive selection information from a user that identifies the provider from among a plurality of providers.

15. A non-transitory computer-readable storage medium containing instructions for controlling a computer processor to:
receive configuration information which specifies a configuration of one or more virtual machines; and
deploy a first virtual machine on a virtualization platform based on the configuration information;
identify, by a service provisioning component in the virtualization platform, and external to the first virtual machine, from the configuration information, a software service including functionality to be consumed by application software installed on the first virtual machine prior to booting the first virtual machine;
identify, by the service provisioning component, a provider of the software service in a provider database, and associating the provider with the first virtual machine, wherein the provider is remote from the first virtual machine;
receive, at the service provisioning component prior to booting the first virtual machine, service provisioning information from the provider of the software service, the service provisioning information including information for accessing the software service upon execution of the application software within the first virtual machine after booting the first virtual machine;
provide the service provisioning information to the first virtual machine while booting the first virtual machine prior to execution of the application software;
generate runtime information to configure the first virtual machine during boot, the runtime information including the service provisioning information;
store the runtime information in a data store accessible by first virtual machine during boot; and
boot the first virtual machine.

16. The non-transitory computer-readable storage medium of claim 15, wherein the configuration information is an Open Virtualization Format (OVF) package in accordance with the Open Virtualization Format Specification.

17. The non-transitory computer-readable storage medium of claim 16, wherein the OVF package comprises a service dependency section that identifies the software service to be consumed by the first virtual machine.

18. The non-transitory computer-readable storage medium of claim 15, wherein the configuration information indicates whether the software service to be consumed by the first virtual machine is a required service or an optional service.

\* \* \* \* \*